Nov. 25, 1958 — J. F. LOVELOCK ET AL — 2,861,848
LUBRICATION SYSTEM
Filed July 19, 1956

INVENTOR
John F. Lovelock and
Frank J. Beager Jr.
BY
Campbell Brumbaugh, Freer Graves
ATTORNEY 2,861,848
Patented Nov. 25, 1958

2,861,848

LUBRICATION SYSTEM

John F. Lovelock, Syosset, and Frank J. Beagan, Jr., Roosevelt, N. Y., assignors to Fairchild Engine and Airplane Corporation, Bay Shore, N. Y., a corporation of Maryland Application July 19, 1956, Serial No. 598,911

1 Claim. (Cl. 308—187)

This invention relates to a lubrication system for a bearing of a rotating shaft and, more particularly, to a lubricating system wherein the lubricating fluid is lifted from a sump to the shaft and bearing by the rise of a gaseous fluid through a restricted passage and then returned through a passage to the sump to permit the lubricating fluid to be recirculated.

Heretofore, difficulty has been experienced in supplying a sufficient quantity of lubricating fluid to the bearings of a rotor shaft in cases where frequent replenishment of the lubricating fluid is not feasible. The shaft and bearings may, for example, be immersed in a sump containing the lubricating fluid. This arrangement, however, does not afford the advantages of a circulating lubricating fluid, and furthermore, when the level of the lubricating fluid drops in the sump, adequate lubrication is not achieved in spite of the fact that the sump may contain a substantial quantity of the lubricating fluid. To overcome this difficulty, wicks have been used to raise the lubricating fluid from the sump to the rotor shaft. The supply of the lubricating fluid by a wick, however, depends on the viscosity of the oil and, therefore, also on the temperature of the oil. For example, at low temperatures, the high viscosity of the oil hinders the flow thereof through the wick. Consequently, the use of wicks to provide adequate lubrication is not satisfactory in cases in which the rotating shaft may be exposed to a wide range of temperature variation.

The object of the present invention is to provide a lubricating system wherein a positive circulation of the lubricating fluid is maintained throughout the full range of operating temperatures and pressure and without the use of moving parts.

In the lubricating system of the present invention, a supply of lubricating fluid is stored in a sump beneath the rotating shaft and bearing to be lubricated, and a lift tube is disposed within the sump, the lower end of which is immersed in the lubricating fluid and the upper end of which is disposed at the height to which the lubricating fluid is to be lifted. A gaseous fluid is introduced into the sump beneath a lift tube, forming bubbles which rise in the lift tube, and the bubbles trap quantities of the lubricating fluid therebetween, lifting the lubricating fluid upwardly toward the rotor shaft to be lubricated. Upon reaching the shaft, the lubricating fluid is moved toward one end of the bearing, and thence, after passing through the bearing, the lubricating fluid is returned to the sump by means of a passage. The gaseous fluid is separated from the lubricating fluid by providing suitable exhaust vents.

In order to facilitate the longitudinal flow of the lubricating fluid along the shaft to the bearings, annular means may be mounted on the rotor shaft adjacent the discharge side of the bearing to exert a centrifugal pumping action on the fluid.

For a complete understanding of the present invention, reference may be made to the detailed description which follows and to the accompanying drawing in which.

Figure 1:
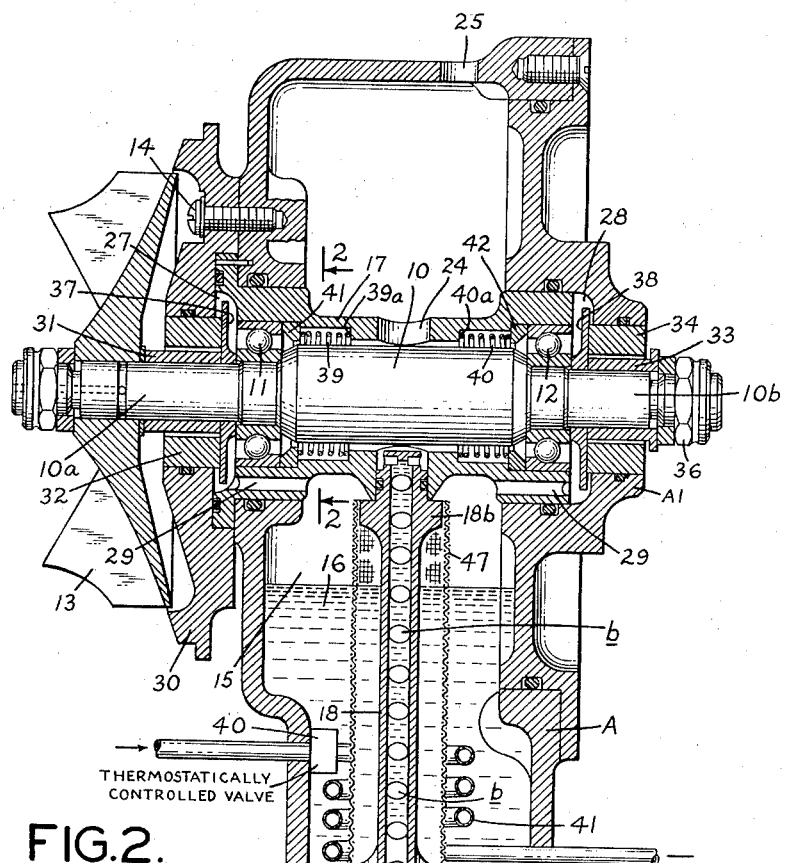
Figure 1 is a cross-sectional elevational view of an apparatus embodying the present invention.
Figure 2:
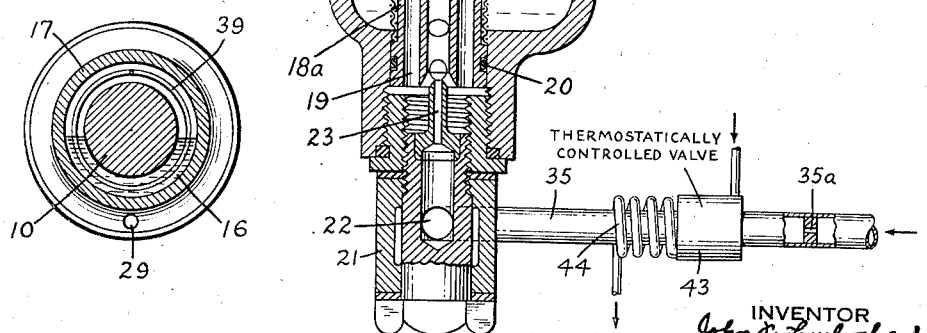
Figure 2 is a view taken along the line 2—2 of Figure 1 looking in the direction of the arrows.

Referring to the drawing, a shaft 10 is rotatably mounted within a housing, generally designated by the reference character A, by means of bearings 11 and 12. The bearings 11 and 12 are accommodated at opposite ends of a hollow bearing cartridge 17 which surrounds the rotating shaft.

Although the type of apparatus to which the present invention is applied is of no importance to the present invention, in the embodiment illustrated in the drawing, the apparatus is a turbine, and the shaft 10 is provided at one end with a length 10a of reduced diameter which carries a fan or impeller 13 thereon, and at the other end with a length 10b of reduced diameter which has a nut 36 threaded to the end thereof. A retainer plate 30 is mounted to the housing A by screws 14, and the portion 10a of the shaft 10 carries a sleeve member 31 thereon which rotates within an annular seal 32 of the retainer plate 30. The portion 10b of the shaft also carries a sleeve member 33 thereon, and leakage between the sleeve member and the bore of the portion A1 of the housing A is prevented by an annular seal 34.

As shown in the drawings, compression springs 39 and 40 are accommodated within the interior of the bearing cartridge 17 in contact with shoulders 39a and 40a, respectively. The springs, therefore, exert an outward force against annular rings 41, 42 to facilitate the removal of the outer races of the bearings when the apparatus is to be dismantled.

The housing A is formed with a hollow chamber 15 therein which serves as a well or sump for a lubricating fluid 16. The upper level of the lubricating oil, as indicated in the drawing, may be substantially below the shaft 10 and bearings 11, 12.

A vertically disposed lift tube 18 is accommodated within the chamber 15. The upper end of the lift tube communicates with the interior of the hollow cartridge 17, and the lower end extends downwardly into the lubricating fluid. The lower end 18a of the lift tube is of enlarged diameter, and a plurality of longitudinal passages are formed in the portion 18a to permit the lubricating fluid to communicate with the lower entrance end of the lift tube 18. The lower end 18a of the lift tube is fitted into the extreme lower end of the housing A, and a sealing ring 20 surrounds the end 18a to prevent leakage of the lubricating fluid from the housing.

In order to prevent dirt, grit or other impurities from being carried with the lubricating fluid through the passages 19 into the lower inlet end of the lift tube, a cylindrical screen 47 may be provided. The screen 47 surrounds the lift tube, being affixed to the enlarged lower end 18a and the enlarged upper end 18b. The mesh of the screen is sufficiently fine to prevent water particles from passing through it when it is wetted by the lubricating fluid. Thus, any water in the oil is permanently trapped outside the screen.

The extreme lower end of the housing A is adapted to receive an elbow fitting 21 which contains an air inlet passage 22 and an upwardly disposed air discharge nozzle 23. The inlet end of the passage 22 is connected by means of a conduit 35 having a restrictor 35a therein with a source of air (or other gaseous fluid) under pressure, and the air is admitted via the passage 22 and the air nozzle 23 into the sump 15 below and in proximity with the lower end of the lift tube 18. Thus, air bubbles b are formed by the air discharged from the nozzle 23, and the bubbles will rise upwardly through the lift tube, lifting small quantities of the lubricating fluid trapped between the bubbles. In this way, the lubricating fluid is raised above the level of the lubricating fluid within the chamber 15 into the interior of the cartridge 17 which surrounds the rotating shaft. The lubricating fluid is thus applied to the outer periphery of the rotating shaft. The air, however, is permitted to escape from the cartridge 17 through a vent opening 24 and from the housing A through a vent opening 25.

The lubricating fluid may be supplied in sufficient quantity to the interior of the cartridge 17 to cause it to flow in opposite directions through the cartridge toward the bearings 11 and 12. If desired, screw threads or ridges may be formed on the outer periphery of the shaft 10 to facilitate the flow thereof toward the bearings. This, however, should not be necessary if an adequate supply of lubricating fluid is introduced into the cartridge 17.

Chambers 27 and 28 are provided outboard, that is to say, on the discharge side, of the bearings 11 and 12 to receive the lubricating fluid therein, and the lubricating fluid is permitted to drain from the chambers 27, 28 back into the sump chamber 15 via passages 29. Thus, the lubricating fluid is returned to the sump for recirculation.

To facilitate the circulation of the lubricating fluid, annular "slinger" disks 37, 38 may be affixed to the rotating shaft 10 within the chambers 27, 28, respectively, and adjacent the bearings 11, 12. The slinger disks 37, 38 exert a centrifugal pumping action on the lubricating fluid, thereby assisting the outward longitudinal flow of the lubricating fluid toward the bearings 11 and 12. The disks 37, 38 also have the effect of converting the lubricant into a fine mist or spray.

The present invention is ideally suited to aircraft applications, since its operation is not substantially affected by altitude, provided, however, that the following conditions are satisfied:

(1) The lift tube submergence and lift must not vary. Since the present lift pump does not lose oil, this requirement is attained.

(2) The oil viscosity and density must remain constant. This will be affected by the varied altitudes, but can be maintained at a constant value by a thermostatically controlled valve 40 which controls the flow of warm air through the coils 41 within the chamber 15.

(3) The air viscosity should also be maintained at a constant value by a thermostatically controlled valve 43 which controls the flow of warm air through the coils 44 which surround the conduit 35.

(4) A constant ratio of weight flow to specific density of the air must be provided to the nozzle 23. This is attained when the air is directed at sonic velocity across a restrictor. The restrictor thus acts as a flow limiter and assures that sufficient air flow is available at the pump nozzle at all altitudes. A better understanding of this point may be obtained from the following equation which applies and in which $W$ = weight of flow in #/min.
$V$ = velocity in ft./min.
$A$ = area of restrictor ft.$^2$
$P$ = air density #/ft.$^3$
$W = VAP$, or $$\frac{W}{P} = VA$$

It should be understood, however, that weight flow and specific density are functions of altitude and will remain in proportion by virtue of the above equation. As a result of this, a constant pressure differential will always be available between the inlet air and the altitude pressure that exists in the housing and on the surface of the oil. This pressure differential will insure that oil is delivered to the bearings at a constant rate, at all altitudes.

By way of summary, a lubricating fluid is stored within a sump or well 15 of the housing A, and air or other gaseous fluid is admitted through the air inlet 22 at the base of the housing, causing bubbles to emerge from the air nozzle 23 and rise in the lift tube 18. Small quantities of the lubricating fluid which are trapped between the bubbles are carried upwardly to the interior of the cylindrical cartridge 17. The air is permitted to escape from the interior of the cartridge 17 through the vent opening 24 and from the housing through the vent opening 25. The oil, on the other hand, flows through the interior of the cartridge 17 toward the bearings 11 and 12, the flow being assisted by the rotation of the slinger disks 37 and 38. Ultimately, the fluid is returned via the passages 30 to the sump 15 for recirculation.

The invention has been shown in a single preferred form and by way of example, and obviously many variations and modifications may be made therein without departing from the spirit of the invention. For example, the upper end of the tube 18 may extend upwardly above the shaft 10 to discharge the lubricating fluid into a reservoir which would permit the lubricating fluid to discharge by gravity to the bearings. The invention, therefore, is not to be limited to any specified form or embodiment except in so far as such limitations are set forth in the claim.

We claim:

A lubricating system for an apparatus having a rotating shaft comprising a housing, a sump formed within the housing for storing a quantity of lubricating fluid, a hollow cartridge mounted to the housing at both ends and surrounding the rotating shaft, bearings for the rotating shaft accommodated within both ends of the hollow cartridge, a lift tube within said housing, the lower end of the tube communicating with the lubricating fluid in the sump and the upper end of the tube communicating with the interior of the hollow cartridge, means for introducing a stream of a gaseous fluid into the sump beneath the lower end of the lift tube, thereby lifting lubricant upwardly above the level thereof in the sump through the lift tube and into the hollow cartridge, means defining chambers outside each end of the hollow cartridge, said chambers surrounding the rotating shaft, rotatable discs accommodated within said chambers and mounted on said shaft, whereby fluid moving through the interior of said hollow cartridge and passing through said bearings will flow into said chambers, passage means formed in the wall of the hollow cartridge at both ends connecting each of said chambers with the sump for permitting the return flow of lubricant from said chambers back into said sump, and vent means formed in the upper region of said hollow cartridge surrounding the rotating shaft for permitting the gaseous fluid to escape therefrom to the atmosphere.

References Cited in the file of this patent
UNITED STATES PATENTS

| | | |
|---|---|---|
| 900,669 | Coxe | Oct. 6, 1908 |
| 2,492,672 | Wood | Dec. 27, 1949 |
| 2,524,798 | Hoskinson | Oct. 10, 1950 |
| 2,716,509 | Saul | Aug. 30, 1955 |